(12) United States Patent
Huang

(10) Patent No.: US 7,030,740 B2
(45) Date of Patent: Apr. 18, 2006

(54) MULTIFUNCTION CAR THEFT ALARM LOCK WITH TIRE PRESSURE SENSING DEVICE

(76) Inventor: Tien-Tsai Huang, No. 4-2, Lane 30, Wu Chuan St., Pan Chiao City, Taipei (TW)

(*) Notice: Subject to any disclaimer, the term of this patent is extended or adjusted under 35 U.S.C. 154(b) by 152 days.

(21) Appl. No.: 10/662,275

(22) Filed: Sep. 16, 2003

(65) Prior Publication Data

US 2005/0012600 A1 Jan. 20, 2005

(30) Foreign Application Priority Data

Jun. 17, 2003 (TW) ............................... 92116454 A

(51) Int. Cl.
*B60R 25/10* (2006.01)
(52) U.S. Cl. ............................. 340/426.1; 340/426.31; 340/429; 340/693.2; 340/442; 307/10.2
(58) Field of Classification Search ............ 340/426.1, 340/426.31, 426.33, 447, 425.5, 429, 426.13, 340/426.35, 426.18, 426.36, 693.2, 333; 200/61.54, 61.93, 52.8; 307/10.1, 10.2, 9.1; 70/209
See application file for complete search history.

(56) References Cited

U.S. PATENT DOCUMENTS

| | | | | |
|---|---|---|---|---|
| 4,609,905 A * | 9/1986 | Uzzo | ........................... | 340/447 |
| 4,660,027 A * | 4/1987 | Davis | ..................... | 340/636.15 |
| 5,055,823 A * | 10/1991 | Fuller | ..................... | 340/426.31 |
| 5,128,649 A * | 7/1992 | Elmer | ..................... | 340/426.31 |
| 5,163,309 A * | 11/1992 | Wu | .............................. | 70/209 |
| 5,258,741 A * | 11/1993 | Fuller | ..................... | 340/426.31 |
| 5,365,215 A * | 11/1994 | Carlo et al. | ............ | 340/426.31 |
| 5,398,017 A * | 3/1995 | Chen | ..................... | 340/426.31 |
| 5,469,135 A * | 11/1995 | Solow | ..................... | 340/426.31 |
| 5,540,092 A * | 7/1996 | Handfield et al. | ......... | 73/146.5 |
| 5,598,725 A * | 2/1997 | Chang | ......................... | 70/209 |
| 5,619,872 A * | 4/1997 | McCarthy | ..................... | 70/209 |
| 5,676,000 A * | 10/1997 | Chen | ......................... | 70/209 |
| 5,678,434 A * | 10/1997 | Kuo et al. | ..................... | 70/209 |
| 5,745,030 A * | 4/1998 | Aaron | ..................... | 340/426.11 |
| 5,755,124 A * | 5/1998 | Chang | ......................... | 70/209 |
| 5,801,617 A * | 9/1998 | Langner et al. | ......... | 340/426.31 |
| 6,075,453 A * | 6/2000 | Kokubu et al. | ............ | 340/5.72 |
| 6,199,415 B1 * | 3/2001 | Markegard et al. | ........... | 70/209 |
| 6,259,362 B1 * | 7/2001 | Lin | .............................. | 340/457 |
| 6,433,678 B1 * | 8/2002 | Hsieh | ..................... | 340/426.31 |
| 6,496,100 B1 * | 12/2002 | Hiebl | ..................... | 340/5.31 |
| 6,734,788 B1 * | 5/2004 | Winner | ..................... | 340/426.1 |
| 6,791,477 B1 * | 9/2004 | Sari et al. | ............. | 340/825.36 |

* cited by examiner

*Primary Examiner*—Daniel Wu
*Assistant Examiner*—Travis Hunnings
(74) *Attorney, Agent, or Firm*—Bacon & Thomas, PLLC

(57) ABSTRACT

A multifunction car theft alarm lock with tire pressure sensing device, includes a lock unit adapted to lock the steering wheel of a car, a sensor module providing multiple sensing modes to enhance the anti-theft function, and tire pressure sensors adapted to detect tire pressure of the car and adapted to enable an audio visual alarm if tire pressure drops below a predetermined value.

9 Claims, 7 Drawing Sheets

MULTIFUNCTION CAR THEFT ALARM LOCK WITH TIRE PRESSURE SENSING DEVICE

BACKGROUND OF THE INVENTION

1. Field of the Invention

The present invention relates to a car theft alarm lock device and, more particularly, to such a multifunction car theft alarm lock with tire pressure sensing device.

2. Description of Related Art

Following fast increasing of personal income in recent years in most countries around the world, most people can afford to have a car for use as a transportation vehicle or for outdoor sports. Because of its high value, a car is an attractive object to thieves, and because of the security system of the car is not perfect, a thief can steal the car easily. Thus, when buying a car, every consumer always considers the security system of the car an important factor. U.S. Pat. No. 6,199,415 discloses a vehicle theft alarm lock, entitled "ANTI-THEFT STEERING WHEEL BLOCKING LOCK", which comprises, in addition to an electronic alarm subassembly, a motion detector to detect the motion of the car. However, when a thief intrudes into the car without causing a motion of the car, the protection function of the anti-theft steering wheel blocking lock becomes invalid. U.S. Pat. No. 6,433,678/B1 discloses a vehicle theft alarm lock, entitled "VEHICLE THEFT ALARM LOCK", which comprises a pressure sensing circuit. The protection function of this design of vehicle theft alarm lock fails if one window of the car is not closed tightly enough or one door of the car is opened gently by the thief.

The above lock devices cannot communicate with car owners who have no idea about the status of their vehicles or the above lock devices, and thus the theft alarm protection measures of the above lock devices are not satisfactory. Furthermore, when the independent power supplies for the above locks fail, the electronic members of the above lock devices cannot work normally and so cannot inform the car owners of thief intrusion. At this time, only the mechanical lock members can provide the protection. However, the thief can easily overcome the limited protection of the above lock devices.

Therefore, it is desirable to provide a multifunction car theft alarm lock with tire pressure sensing device that eliminates the aforesaid drawbacks and provides safety of the car.

SUMMARY OF THE INVENTION

It is the main object of the present invention to provide a multifunction car theft alarm lock including a digital ID recognition function, providing a better protection than the mechanical car theft alarm locks.

It is another object of the present invention to provide a multifunction car theft alarm lock with a tire pressure sensing device, which detects the status of the tire pressure and indicates the detected result by means of sound and light, thus improving the safety of the car.

It is still another object of the present invention to provide a multifunction car theft alarm lock, which has an infrared sensor installed therein to enhance the detection of criminals.

It is still another object of the present invention to provide a multifunction car theft alarm lock, which has a two-way transmission function to provide the car owner with the current status of the car.

It is still another object of the present invention to provide a standby power set for the multifunction car theft alarm lock, which keeps the alarm lock working when the internal power supply of the lock fails.

To achieve these and other objects of the present invention, the car theft alarm lock for use in a steering wheel of a transportation vehicle comprises: a lock unit coupled to the steering wheel; a key insertable into the lock unit for releasing the coupling between the lock unit and the steering wheel; at least one electronic sensor installed in an electronic module thereof, the at least one electronic sensor being used to detect vertical and horizontal vibrations of the transportation vehicle, movement of an object inside the transportation vehicle, and output a signal of detection, wherein the electronic module not only inputs the signal of detection and outputs the signal of detection to a far end, but also inputs a signal of setting from the far end; a function setting device used to input and indicate the signal of detection from the electronic module, and set and output the signal of setting to enable/disable the at least one electronic sensor; a power supply unit used to provide the necessary working power to the lock unit and the electronic module; a standby power set used to provide a standby power supply; and a standby power circuit used to provide the standby power supply to the lock unit and the electronic module if the power supply unit fails.

The invention also provides a multifunction car theft alarm lock with tire pressure sensing device, which comprises: a lock unit coupled to a steering wheel of the transportation vehicle; a key insertable into the lock unit for releasing the coupling between the lock unit and the steering wheel; a sensor module with at least one sensing function used to detect a static/motion status of the transportation vehicle and to output a signal of detection when the static/motion status of the transportation vehicle has been changed one way or the other; at least one tire pressure sensor for detecting a status of the tire pressure of the transportation vehicle and for transmitting a signal of low pressure if the pressure of one tire drops below a predetermined pressure value; an electronic module including the sensor module installed in the lock unit, for inputting the signal of low pressure and outputting the signal of detection and the signal of low pressure to a far end; a setting device for inputting the signal of detection/the signal of low pressure and providing a sound and lighting effect corresponding to the signal of detection/the signal of low pressure; a power supply unit for providing a necessary working power to the lock unit and the electronic module; a standby power set for providing a standby power supply; and a standby power circuit for providing the standby power supply to the lock unit and the electronic module if the power supply unit fails.

The multifunction car theft alarm lock with tire pressure sensing device provides multiple sensing functions to enhance anti-theft protection and to detect the pressure status of tires; with two-way signal transmission function for vehicle drivers to set the functions of the lock, and to be informed about the detected result.

DETAILED DESCRIPTION OF THE PREFERRED EMBODIMENT

Figure 1:
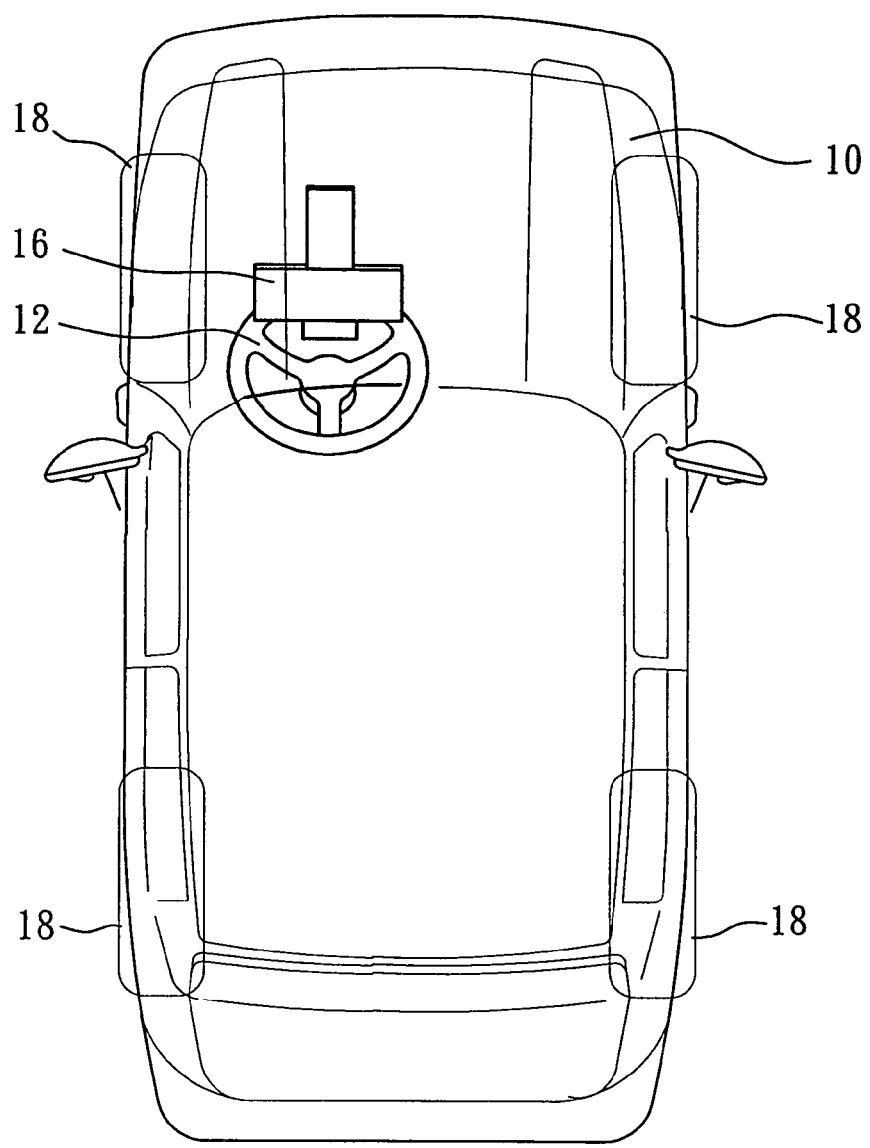
FIG. 1 is a schematic drawing showing a multifunction car theft alarm lock according to the present invention, fitted to a car.
Figure 1:
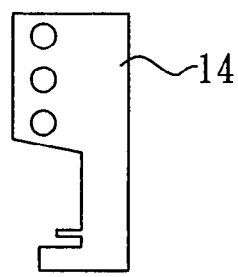

Referring to FIG. 1, a multifunction car theft alarm lock used in a car 10 is shown. The multifunction car theft alarm lock includes two parts, namely, a lock unit 16 and a remote controller 14. The lock unit 16 is activated to lock a steering wheel 12 of the car 10. The remote controller 14 is designed to disable the locking status of the lock unit 16. When the steering wheel 12 is locked, the car 10 can only move straight forwards or backwards, and therefore a thief cannot drive the car 10 away, i.e., cannot steal the car 10.

Figure 2:
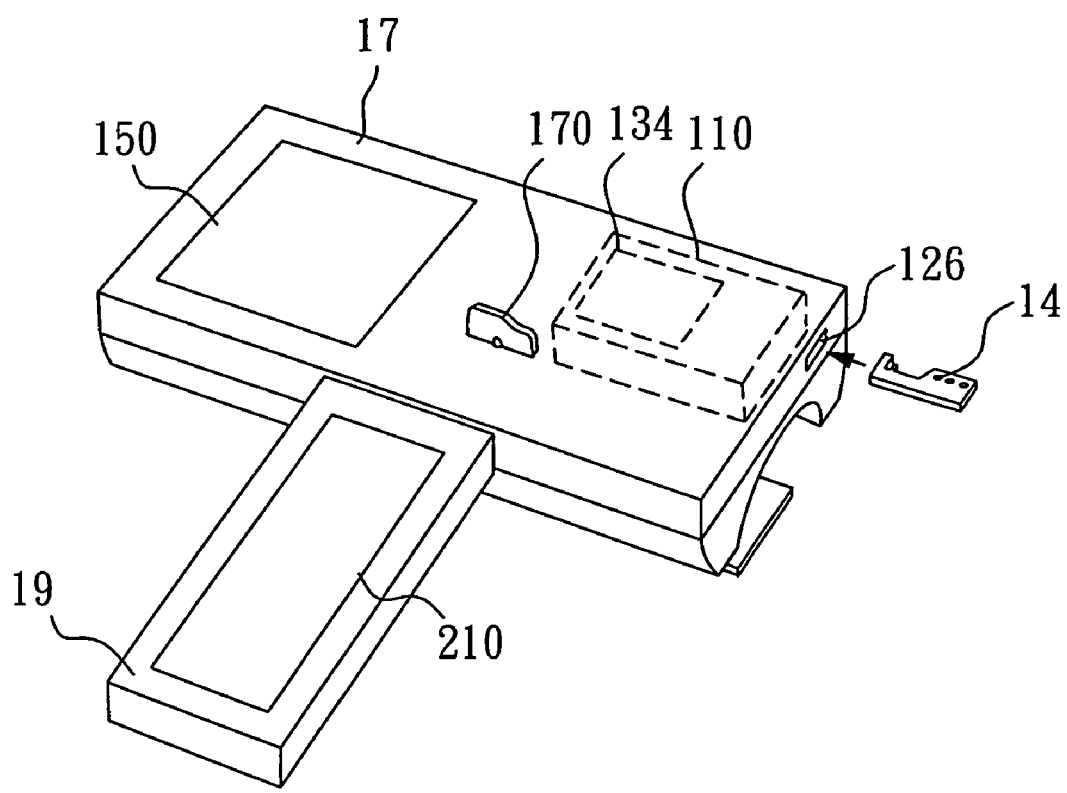
FIG. 2 is a schematic drawing showing an arrangement of the digital electronic lock and the digital electronic key of the multifunction car theft alarm lock according to the present invention.

Referring to FIG. 2, the lock unit 16 is T-shaped, comprising a lock body 17 and a handle 19. The lock body 17 includes a mechanical lock or a digital electronic lock 110 for locking (coupling) the lock unit 16 to the steering wheel 12 (controller). The handle 19, has installed therein, an electronic module 210 adapted to provide detection and alarm functions. If the lock body 17 includes a mechanical lock, the lock unit 16 will be disengaged from the steering wheel 12 when inserting a matching key into the lock body 17. If the lock body 17 includes a digital electronic lock 110 installed therein, the lock unit 16 will be disengaged from the steering wheel 12 when inserting a matching digital electronic key 140, which is incorporated into the remote controller 14, into the digital electronic lock 110. Because a digital electronic lock has more advantages than a mechanical lock (for example, duplicating a matching digital electronic key is not easy), the multifunction car theft alarm lock has installed therein the digital electronic lock 110. However, this is not a limitation.

Referring to FIGS. 3–6, the multifunction car theft alarm lock is divided into a digital electronic lock 110, a digital electronic key 140, a power supply unit 150, a standby power circuit 160, a standby power set 170, an electronic module 210, and a function setting device 222. The digital electronic lock 110, the power supply unit 150, the standby power circuit 160, and the electronic module 210 are installed in the lock unit 16; while the function setting device 222 and the digital electronic key 140 are installed in the remote controller 14. It is understood that the function setting device 222 and the digital electronic key 140 can be independent from each other and used separately. The positions of the aforesaid elements are determined subject to actual requirements, not limited to the aforesaid example.

Figure 3:
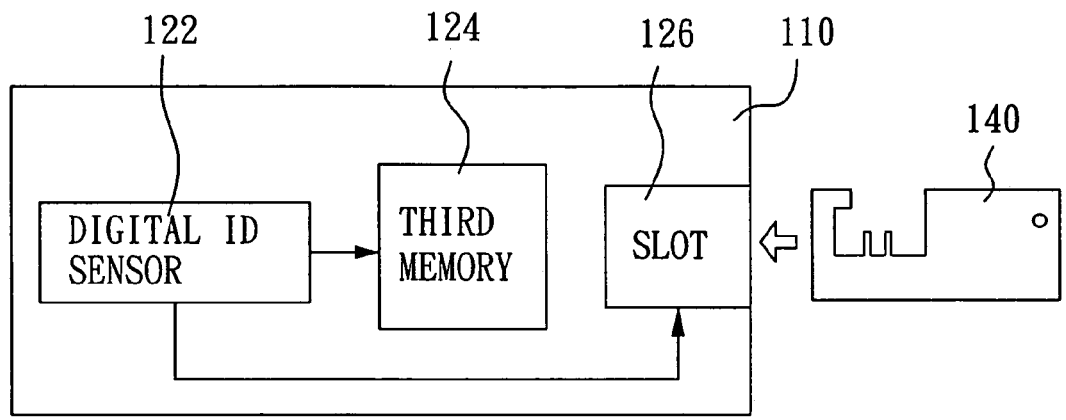
FIG. 3 is a block diagram of a digital electronic lock and key of the multifunction car theft alarm lock according to the present invention.

FIG. 3 is a block diagram of the digital electronic lock 110 and the digital electronic key 140. The digital electronic lock 110 comprises a digital ID sensor 122, a third memory 124, and a slot 126. When the digital electronic lock 110 touches the steering wheel 12, the digital electronic lock motor (not shown) is activated to drive a gear (not shown) to further lock the lock unit 16 in the steering wheel 12. The third memory 124 stores a digital ID (identification) code and the digital electronic key 140 stores therein a corresponding digital ID code. When the digital electronic key 140 is inserted into the slot 126, the digital ID sensor 122 detects if the digital ID code in the digital electronic key 140 matches the corresponding digital ID code in the third memory 124. If both digital ID codes match, the digital electronic lock motor is driven to unlock the car theft alarm lock 16 from the steering wheel 12. Because the encoding of the digital ID codes is complex, it is not easy to decode the digital ID codes within a short time. Therefore, the multifunction car theft alarm lock provides a good protection to the car. The aforesaid digital electronic lock 110 and digital electronic key 140 are exemplified only. Other similar commercially available products may be used.

Figure 4:
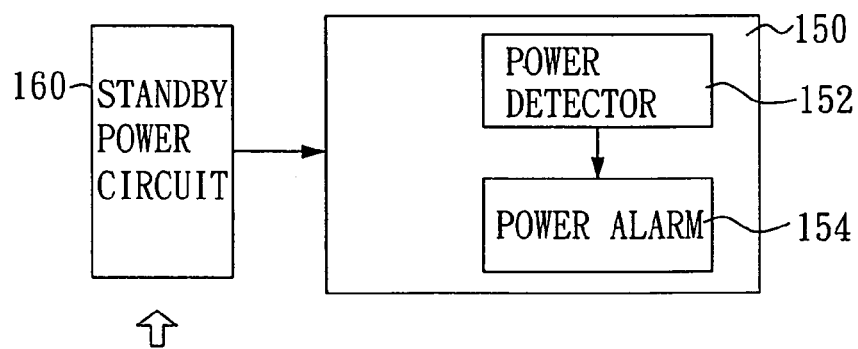
FIG. 4 is a block diagram of the power supply unit, standby power circuit and standby power set of the multifunction car theft alarm lock according to the present invention.
Figure 4:
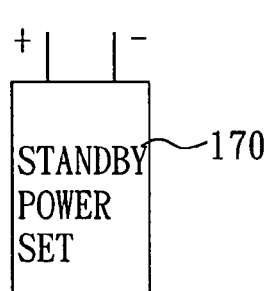

FIG. 4 is a block diagram of the power supply unit 150, the standby power circuit 160, and the standby power set 170. The power supply unit 150 has a plurality of DC batteries mounted therein for providing necessary working power to the elements contained in the lock unit 16. The power supply unit 150 further comprises a power detector 152 and a power alarm 154. The power detector 152 detects the power status of the power supply unit 150, and enables the power alarm 154 when the power status is low. The power alarm 154 can be an LED (Light Emitting Diode) as a visual alarm, and a buzzer as an audio alarm. When the power of the power supply unit 150 drops below a predetermined low level, the power detector 152 activates the power alarm 154 to send a visual or audio alarm signal.

The standby power set 170 has at least one DC battery installed therein and electrically connected to the standby power circuit 160. The internal circuit of the standby power circuit 160 is electrically connected to the power supply unit 150. When the power provided by the power supply unit 150 is insufficient to drive the electronic lock motor, i.e., when the digital electronic lock 110 fails, the vehicle user can insert the standby power set 170 into the standby power circuit 160, so as to enable the standby power set 170 to provide necessary working power to the digital electronic lock 110. Furthermore, the power supply unit 150 also provides the necessary working power to the electronic module 210.

Figure 5:
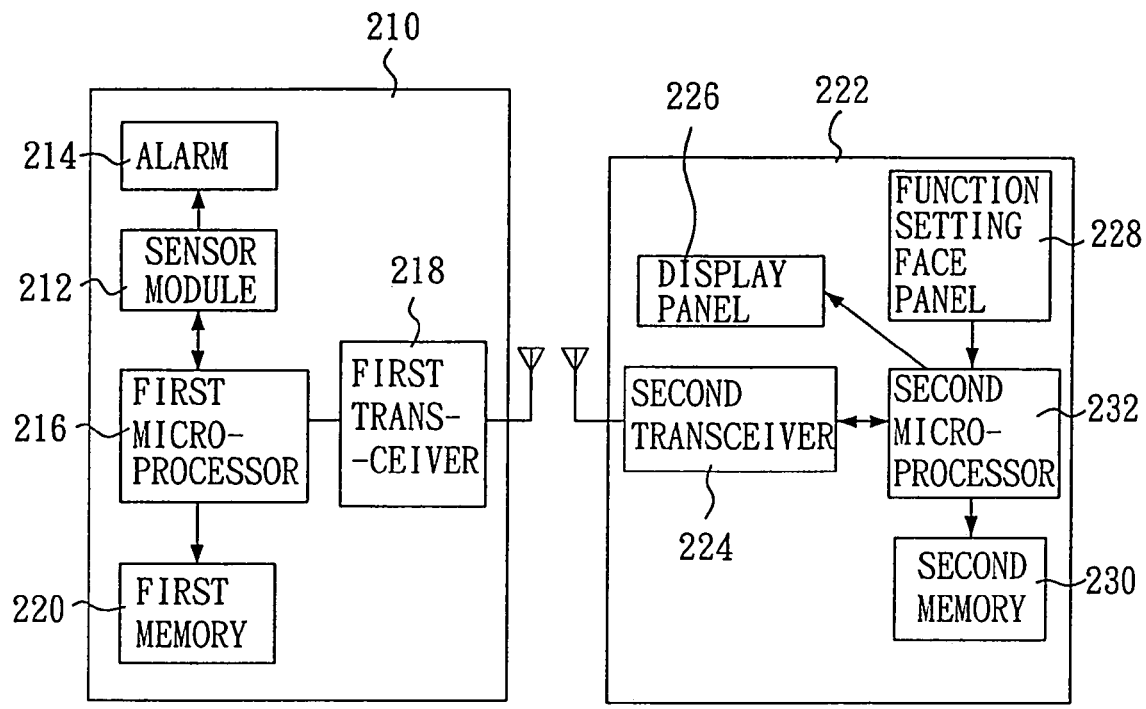
FIG. 5 is a block diagram of the electronic module and function setting device of the multifunction car theft alarm lock according to the present invention.
Figure 6:
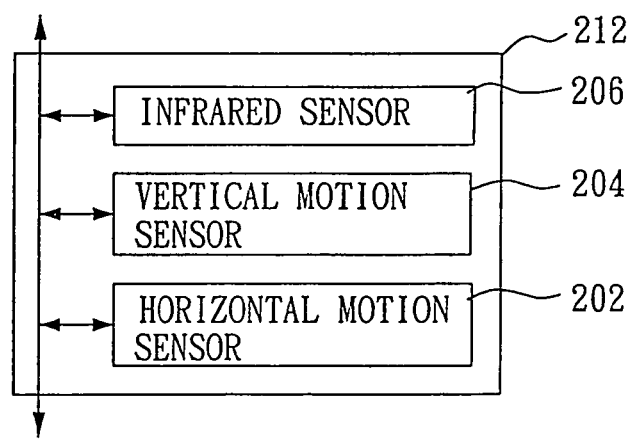
FIG. 6 is a block diagram of the sensor module of the electronic module of the multifunction car theft alarm lock according to the present invention.

FIG. 5 is a block diagram of the electronic module 210 and the function setting device 222. The electronic module 210 comprises a sensor module 212, an alarm 214, a first microprocessor 216, a first transceiver 218, and a first memory 220. As illustrated in FIG. 6, the sensor module 212 comprises a horizontal motion sensor 202, a vertical motion sensor 204, and an infrared sensor 206. The horizontal motion sensor 202 is used to detect horizontal vibration of the car 10 (such as opening doors). The vertical motion sensor 204 is used to detect vertical vibration of the car 10 (such as intruding the car 10). The infrared sensor 206 is used to detect movement of an object (such as a human body) in the car 10. The car 10 stands at a static status after the function setting device 222 enables the sensor module 212, and the car 10 will change from the static status to a motion status when the door is opened, so that an abnormally shock is detected, or that a human body moving in the car 10 is detected. If the car 10 changes to a motion status, the sensor module 212 immediately sends a signal of detection to the first microprocessor 216 and the alarm 214. Upon receipt of the signal of detection, the microprocessor 216 outputs the signal of detection to somewhere, such as a far end, via the first transceiver 218. Further, the first transceiver 218 can also receive a signal of setting from the far end and then outputs the received signal of setting to the first microprocessor 216. The alarm 214 can be an LED or buzzer, or their combination. When receiving a signal of detection, the alarm 214 produces a visual and/or audio alarm to threaten the intruder.

Further, the horizontal motion sensor 202 and the vertical motion sensor 204 are identical devices apart from their positioning, and are each formed of the same electronic device. For instance, an electronic vibration sensor, which has one end relatively heavier, and the other end for mounting. When the electronic device is in a vertical position, it is used as a horizontal motion sensor 202; and when the electronic device is in a horizontal position, it is used as a vertical motion sensor 204. Because the horizontal motion sensor 202 and the vertical motion sensor 204 are identical with each other, the manufacturing cost of the sensor module 210 is minimized.

As indicated above, the lock body 16 should be coupled to the steering wheel 12 of the car 10 to provide a better protection. However, in addition, the electronic module 210 provides the car 10 with static and motion status detection and alarm functions.

The function setting device 222 is a one-way communication device and adapted to receive the signal of detection from the first transceiver 218, and comprises a second receiver, a display panel 226, a second memory 230, and a second microprocessor 232. The display panel 226 is formed of an array of LEDs, an LCD (liquid crystal display), or a buzzer. After the second receiver receives the signal of detection from the electronic module 210, it outputs the received signal of detection to the second microprocessor 232. Upon receiving the signal from the second transceiver 224, the microprocessor 232 enables the display panel 226, causing the display panel 226 to produce a visual or audio alarm to the owner of the car 10.

Alternatively, the function setting device 222 can be a two-way communication device after replacing the second receiver with a second transceiver 224, and further comprises a function setting face panel 228. The second transceiver 224 not only receives the signal of detection but also outputs a signal of setting to the first transceiver 218. The function setting face panel 228 comprises a plurality of function keys for operation by the user to enable or disable the sensor module 212 or alarm 214. When the function setting face panel 228 is operated by the user, the function setting face panel 228 outputs the signal of setting to the second microprocessor 232, thereby causing the second microprocessor 232 to output the signal of setting to the first microprocessor 216 via the second transceiver 224 and the first transceiver 218. Upon receipt of the signal of setting, the first microprocessor 216 enables or disables the sensor module 212 or alarm 214. The function keys of the function setting face panel 228 are adapted to enable/disable one or all of the horizontal motion sensor 202, vertical motion sensor 204 and infrared sensor 206 of the sensor module 212, and to enable/disable the alarm 214.

Further, the first microprocessor 216 can also produce a communication code, store the communication code in the first memory 220, and transmit the communication code to the function setting device 222. Alternatively, the first microprocessor 216 can automatically produce the communication code at random. When receiving the communication code from the electronic module 210, the function setting device 222 stores the communication code in the second memory 230. As the function setting device 222 outputs the signal of setting, the first microprocessor 216 compares the communication code in the first memory 220 to the communication code received from the electronic module 210. If the communication codes match, the first microprocessor 216 accepts the signal of setting. Further, the second microprocessor 232 can measure the distance between the function setting device 222 and the electronic module 210 by calculating the duration of transmitting or receiving signals between the function setting device 222 and the electronic module 210, and indicates the distance status in the display panel 226. The aforesaid distance measuring function or communication code generating function can be provided by either of the first microprocessor 216 or the second microprocessor 232.

Figure 7:
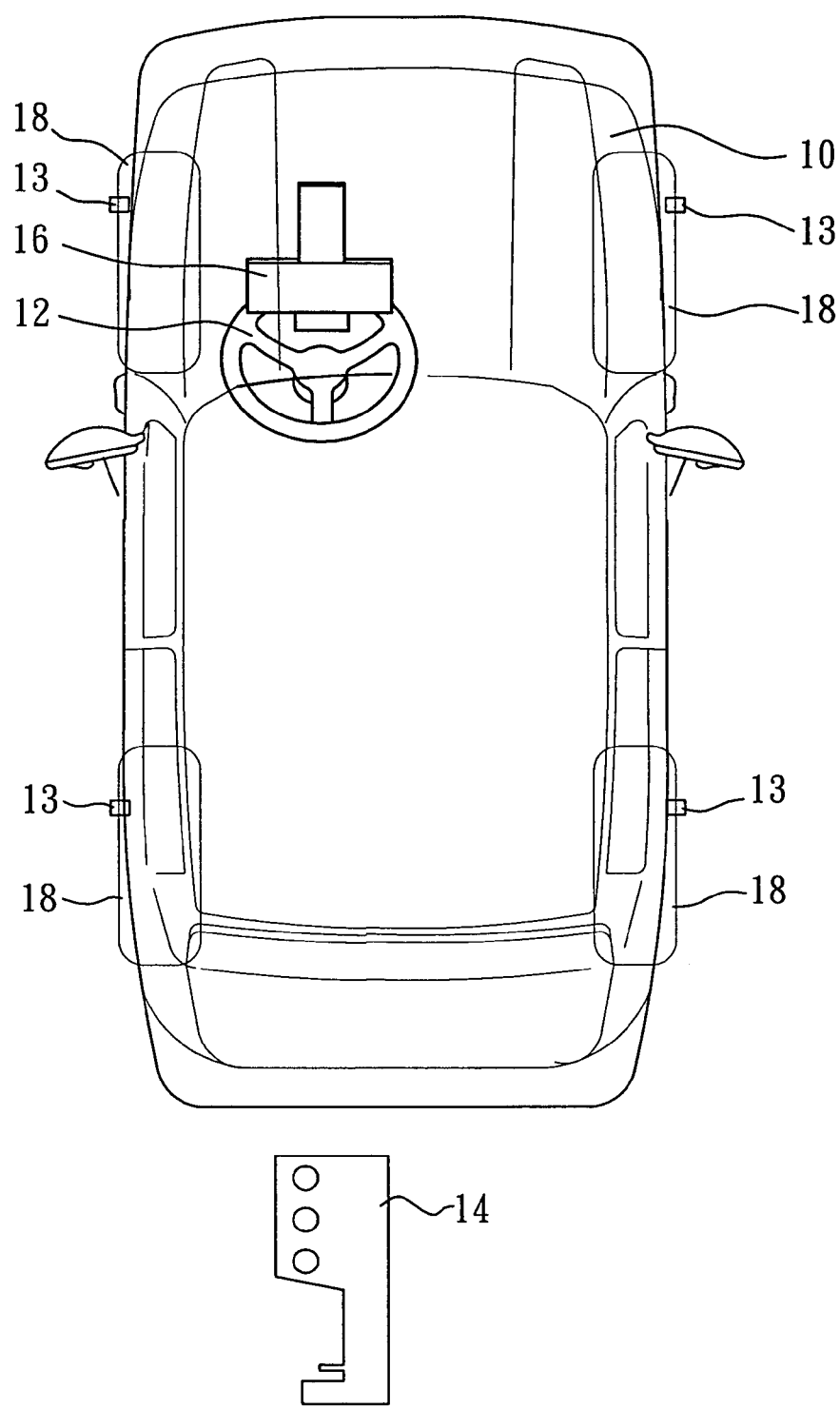
FIG. 7 is a schematic drawing showing the multifunction car theft alarm lock with tire pressure sensing device according to the present invention.

Further, four tire pressure sensors can be incorporated into the multifunction car theft alarm lock, as shown in FIG. 7, forming a multifunction car theft alarm lock with tire pressure sensing device, which includes three parts, namely, the tire pressure sensors 13, the remote controller 14, and the lock body 16. The remote controller 14 and the lock body 16 are the same as the like members in the aforesaid multifunction car theft alarm lock. The tire pressure sensors 13 are adapted to detect the tire pressure (air pressure) of the tires 18 of the car 10, and to output the detected result to the lock body 16.

Figure 8:
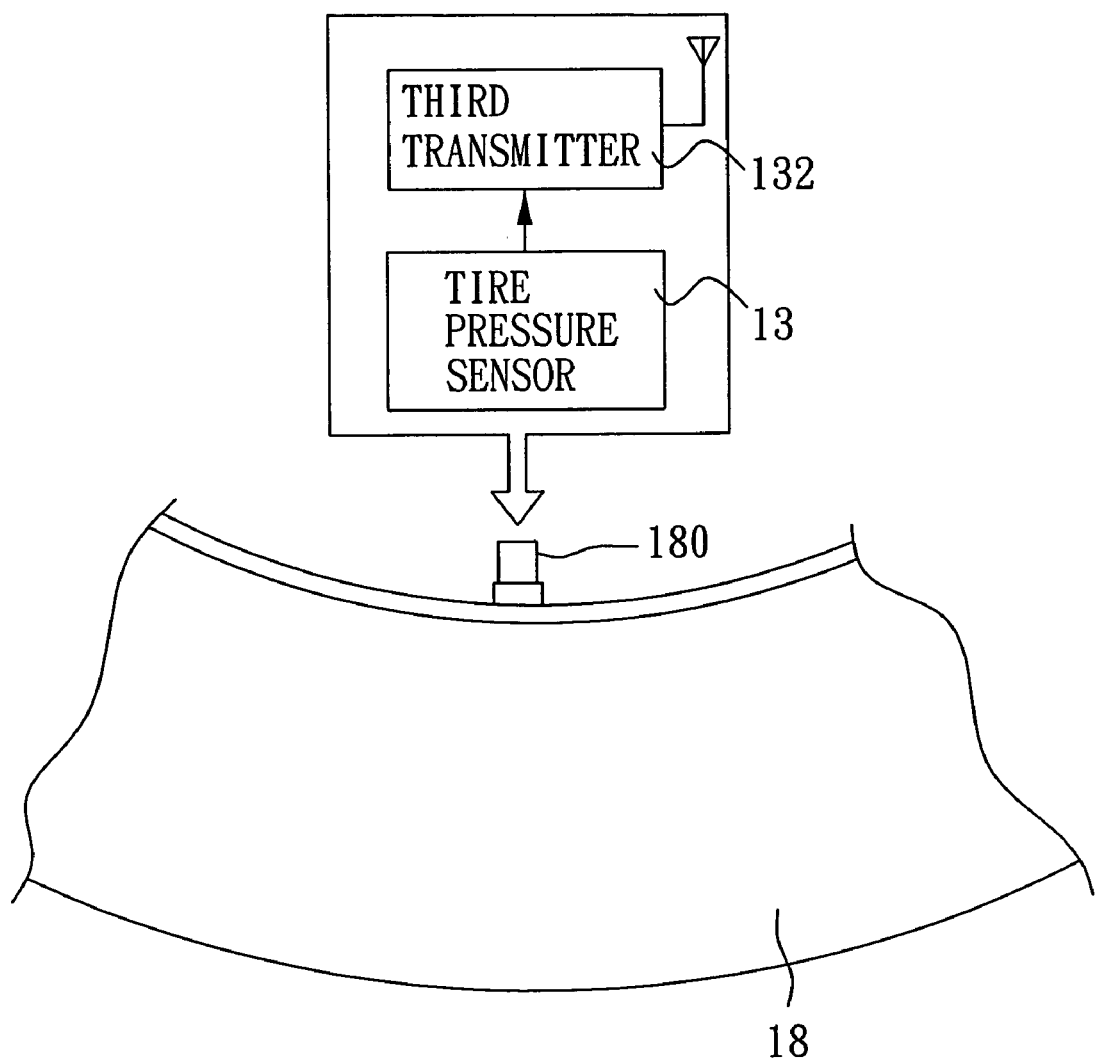
FIG. 8 is a schematic drawing showing an arrangement of the tire pressure sensor according to the present invention.
Figure 9:
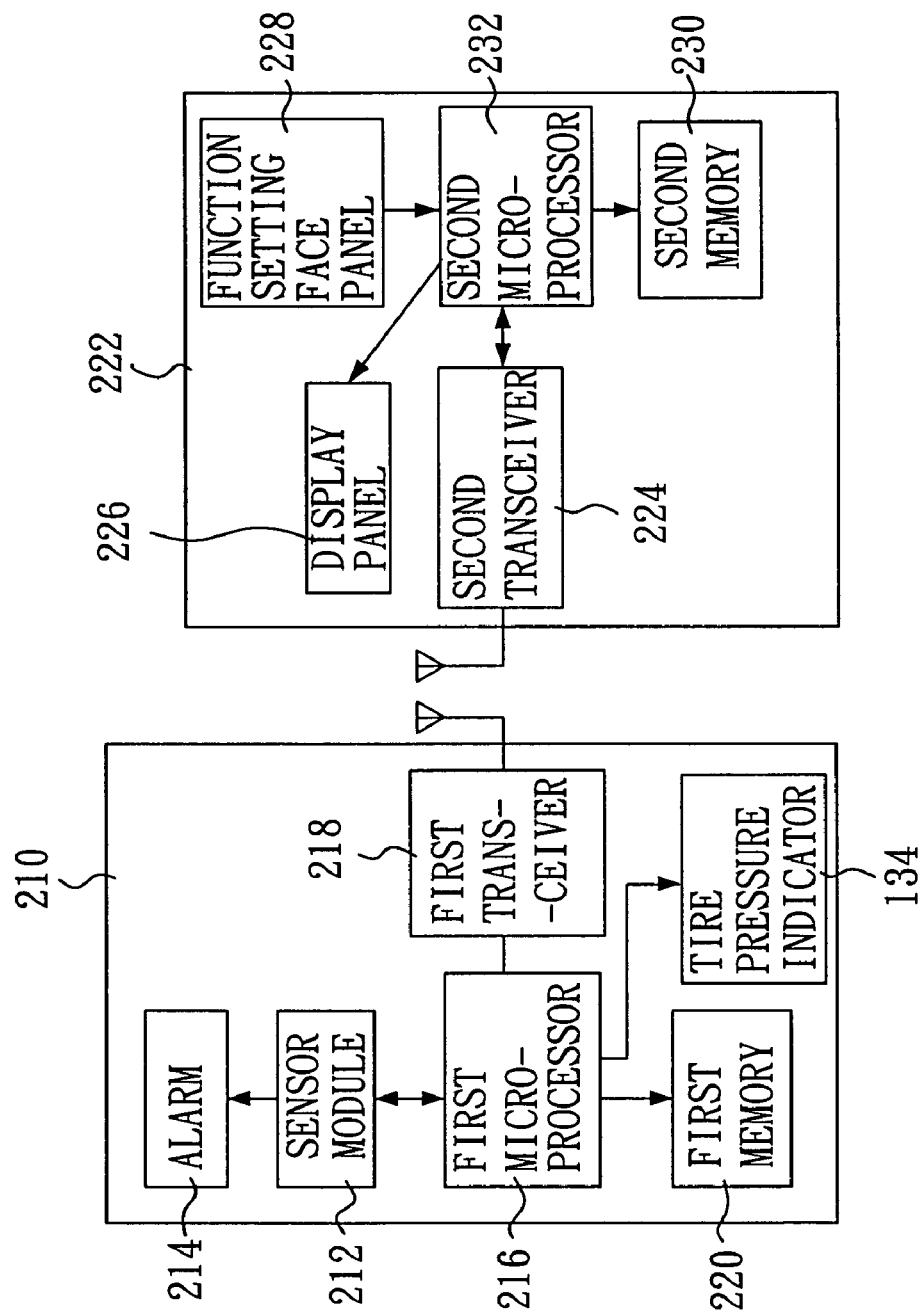
FIG. 9 is a block diagram of an alternative form of the electronic module and function setting device of the multifunction car theft alarm lock with tire pressure sensing device according to the present invention.

Referring to FIG. 8, the tire pressure sensors 13 are coupled to the air nozzles 180 of the tires 18 or installed inside of the tires 18, and are connected to a third transmitter 132 respectively. As illustrated in FIG. 9, the display panel 226 further comprises a tire pressure indicator 134. The tire pressure sensors 13 detect the pressure of the tires 18. If the pressure of one tire 18 drops below a predetermined value, the corresponding tire pressure sensor 13 outputs a signal of low pressure to the third transmitter 132, which in turn transmits the signal of low pressure to the first microprocessor 216 for further processing via the first transceiver 218. Upon receipt of the signal of low pressure, the first microprocessor 216 enables the alarm 214 and the tire pressure indicator 134, and at the same time outputs the signal of low pressure to the function setting device 222, causing the second microprocessor 232 to enable the display panel 226. Thus, the user knows the status of tire pressure and can immediately take the necessary steps to ensure a safety driving. Further, the user can operate the function setting face panel 228 to disable the tire pressure indicator 134, the alarm 214, or the display panel 226. The tire pressure sensor 13 can be a mechanical device, for example, the "DIAPHRAGM-TYPE TIRE PRESSURE INDICATOR" disclosed in U.S. Pat. No. 6,525,655 or the "TIRE PRESSURE INDICATOR" disclosed in U.S. Pat. No. 5,289,161. Alternatively, the tire pressure sensor 13 can be an electronic type, for example, the "TIRE PRESSURE INDICATOR" disclosed in U.S. Pat. No. 5,694,111.

The communication technology employed to the first transceiver 218, the second transceiver 224 and the transmitter 132 can be subject to user's requirements either digital wireless communication technology or analog mode.

As indicated above, the multifunction car theft alarm lock with tire pressure sensing device provides better anti-theft function than prior art designs, and can inform the user of the current status of the lock body 16 via the function setting device 222. Further, the multifunction car theft alarm lock with tire pressure sensing device provides the user with the information of current tire pressure status, ensuring a safety driving.

Although the present invention has been explained in relation to its preferred embodiments, it is understood that many other possible modifications and variations can be made without departing from the spirit and scope of the invention as hereinafter claimed.

What is claimed is:

1. A multifunction car theft alarm lock with tire pressure sensing device used in a transportation vehicle, comprising:
   a T-shaped lock unit having a coupling adapted to couple the lock unit to a steering wheel of a transportation vehicle;
   a digital electronic lock operably connected to said coupling to selectively release said coupling from the steering wheel;
   a key insertable into the lock unit for releasing the coupling;
   a sensor module with a plurality of sensing functions, including an infrared sensing function, a horizontal motion sensing function and a vertical motion sensing function, used to detect a status of the transportation vehicle and to output a signal of detection when the status of the transportation vehicle has been changed;
   at least one tire pressure sensor for detecting a status of a tire pressure of the transportation vehicle and for transmitting a signal of low pressure if the tire pressure drops below a predetermined pressure value;
   an electronic module including the sensor module installed in the lock unit, for inputting the signal of low pressure and outputting the signal of detection and the signal of low pressure to a far end;
   a setting device adapted for receiving the signal of detection and the signal of low pressure, the setting device providing a sound and lighting effect corresponding to each of the signal of detection and the signal of low pressure;
   a power supply unit for providing a necessary working power to the lock unit and the electronic module;
   a standby power set for providing a standby power supply; and
   a standby power circuit for providing the standby power supply to the lock unit and the electronic module if the power supply unit fails.

2. The multifunction car theft alarm lock with tire pressure sensing device as claimed in claim 1, wherein the digital electronic lock has a digital ID code stored therein, and the key is a digital electronic key having a corresponding ID code; and wherein the digital electronic lock disables the coupling between the lock unit and the steering wheel if the digital ID code and the corresponding ID code match after insertion of the digital electronic key into the lock unit.

3. The multifunction car theft alarm lock with tire pressure sensing device as claimed in claim 1, wherein the horizontal motion sensing function and the vertical motion sensing function are provided by two identical electronic sensors; wherein one electronic sensor positioned horizontally provides the vertical motion sensing function to detect a vertical vibration of the transportation vehicle, and another electronic sensor positioned vertically provides a horizontal motion sensing function to detect if the door of the transportation vehicle opens.

4. The multifunction car theft alarm lock with tire pressure sensing device as claimed in claim 1, wherein the infrared sensing function detects movement of a human body in the transportation vehicle.

5. The multifunction car theft alarm lock with tire pressure sensing device as claimed in claim 1, wherein each at least one tire pressure sensor is coupled to an air nozzle.

6. The multifunction car theft alarm lock with tire pressure sensing device as claimed in claim 1, wherein each at least one tire pressure sensor is coupled to the inside of a tire.

7. The multifunction car theft alarm lock with tire pressure sensing device as claimed in claim 1, wherein each at least one tire pressure sensor includes a transmitter for transmitting the signal of low pressure.

8. The multifunction car theft alarm lock with tire pressure sensing device as claimed in claim 1, wherein the power supply unit comprises a power detector and a power alarm, and wherein the power detector is used to detect the power level of the power supply unit and to enable the power alarm if a power supply from said power supply unit is below a predetermined value.

9. The multifunction car theft alarm lock with tire pressure sensing device as claimed in claim 1, wherein the power supply unit, the electronic module, and the standby power circuit are installed in the lock unit.

* * * * *